(No Model.)
R. O. BURGESS.
BRIDLE BIT.
No. 377,845. Patented Feb. 14, 1888.
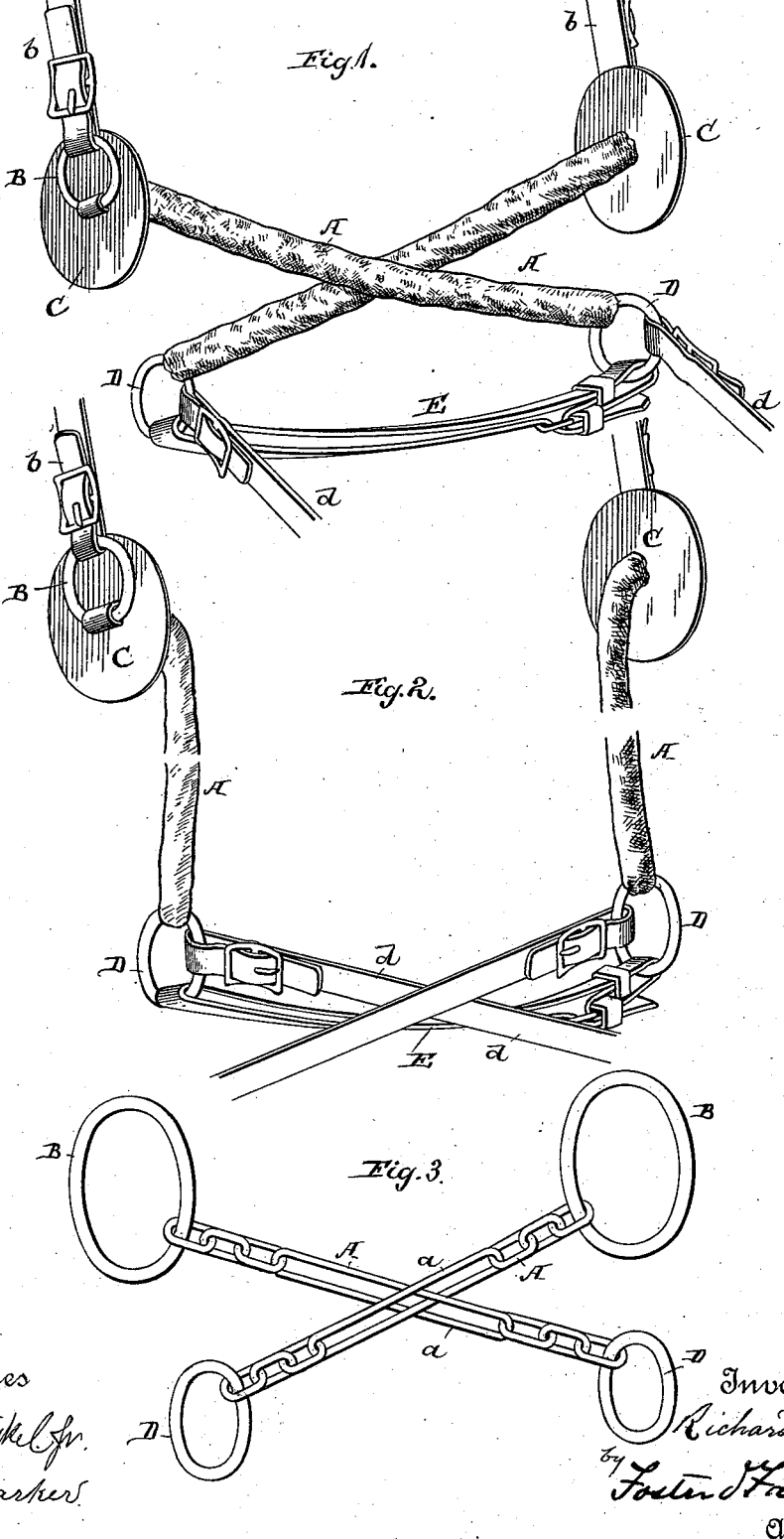

UNITED STATES PATENT OFFICE.

RICHARD O. BURGESS, OF PROVIDENCE, RHODE ISLAND.

BRIDLE-BIT.

SPECIFICATION forming part of Letters Patent No. 377,845, dated February 14, 1888.

Application filed December 8, 1887. Serial No. 257,328. (No model.)

*To all whom it may concern:*

Be it known that I, RICHARD O. BURGESS, a citizen of the United States, residing at Providence, in the county of Providence and State of Rhode Island, have made certain new and useful Improvements in Bridle-Bits, of which the following is a specification.

This invention relates to an improved cross-pull bridle-bit in which are employed two mouth-pieces, preferably flexible, and crossed in the horse's mouth and secured to the bridle-straps and to the driving-reins, as hereinafter set forth, whereby I am enabled to more easily control an unruly or hard-pulling animal than with the bits of ordinary construction, and whereby, also, the bits may be easily removed from the animal's mouth whenever desired without necessitating the removal of the bridle or detaching any of the straps.

Figure 1 is a perspective view showing the position the bit occupies when in the animal's mouth. Fig. 2 is a perspective view of the same when removed from the animal's mouth, but not disconnected from the bridle or reins. Fig. 3 illustrates another form of my invention.

In the drawings, A A represent the bits or mouth-pieces, which are by preference flexible and covered with leather, rubber, or other equivalent material. Each carries at one end a ring, B, to which the cheek-straps $b$ of the bridle are attached, and at the other or free end a ring, D, to which the driving-rein $d$ is attached. The rings B lie close to and on the outside of the disk-shaped cheek-pieces C C, to which the bits A are also connected. The rings D D, while perfectly free from connection with the bridle except through the mouth-pieces A, as shown, are connected with each other by a strap, E, which serves to keep the bits in the animal's mouth should the reins become slack at any time, as when the animal is standing.

A bit of the character described is easy upon the animal as ordinarily used; but it will be seen that if the reins $d$ are drawn backward with great force the bit-pieces A will not only be drawn backward in the animal's mouth, but will also draw inward the cheek-pieces C against the animal's jaws, which will result in its being more easily controlled than when bits in which the mouth-pieces extend across directly from cheek-piece to cheek-piece are employed.

When it is desired to remove the bits from the animal's mouth without taking off the bridle or unfastening any of the straps, it is only necessary to loosen the reins $d$ and carry forward the free ends of the mouth-pieces A until removed from the mouth, when they will hang down from rings B in the position shown in Fig. 2, the reins being crossed under the animal's neck. The bits may be replaced in the animal's mouth by reversing the last-described movements.

In Fig. 3 I have shown another form of my invention, in which the mouth-pieces A are provided centrally with links $a$, one at least being elongated sufficiently to permit the other to slide therein and it to slide sufficiently to draw inward the cheek-pieces C. These pieces, though connected, are still sufficiently free in their movements to permit them to be easily removed from the animal's mouth without disconnecting any of the parts.

While I prefer to employ strap E with the form of bit shown in Figs. 1 and 2, I do not wish to be limited to the use thereof, as some of the features of my invention would still be preserved though it were dispensed with.

The important feature of my invention, which consists of the mouth-pieces secured each at one end to one of the cheek-pieces or cheek-strap rings and at the opposite end to the driving-rein, but not to the opposite cheek piece or strap either directly or indirectly, would be embodied in a bit wherein the mouth-pieces A were rigid, and hence I do not wish to be limited to the use of flexible mouth-pieces.

Without limiting myself to the precise construction and arrangement of parts shown, I claim—

1. In a bridle-bit, two mouth-pieces free to move longitudinally with relation to each other and each provided at one end with a ring, B, adapted to be connected with one of the cheek-straps of a bridle, and having its opposite end free from connection with the bridle and provided with a ring, D, to which the driving-rein is adapted to be secured, substantially as described.

2. In a bridle-bit, two crossed mouth-pieces, each connected at one end only with the cheek straps or pieces of the bridle, and connected at the opposite end with the driving-rein, substantially as described.

3. In a bridle-bit, two crossed flexible mouth-pieces, A A, connected with cheek-pieces and the bridle-straps, and at their ends opposite the cheek-pieces to the driving-reins, substantially as described.

4. In a bridle-bit, two crossed mouth-pieces, each connected at one end only with the bridle-straps, and connected at the opposite end to the driving-rein, the ends of the two mouth-pieces connected to the driving-reins being connected with each other by a strap, E, substantially as described.

5. In a bridle-bit, two mouth-pieces, A A, each provided centrally with links $a$ and at one end with a ring, B, adapted to be connected with one of the cheek-straps of a bridle, and its opposite end provided with a ring, D, to which the driving-rein is secured, substantially as described.

In testimony whereof I have signed my name to this specification in the presence of two subscribing witnesses.

RICHARD O. BURGESS.

Witnesses:
GEORGE N. SHERMAN,
CHARLES B. GOULD.